United States Patent
Jang et al.

(10) Patent No.: US 6,562,917 B2
(45) Date of Patent: May 13, 2003

(54) METHOD FOR PREPARING POLYBUTADIENE HAVING CONTROLLED MOLECULAR WEIGHT AND HIGH 1,4-CIS CONTENT

(75) Inventors: Young-Chan Jang, Taejeon (KR); Pil-Sung Kim, Taejeon (KR); Gwang-Hoon Kwag, Taejeon (KR); A-Ju Kim, Taejeon (KR); Seung-Hwon Lee, Taejeon (KR)

(73) Assignee: Korea Kumho Petrochemical Co., Ltd., Seoul (KR)

( * ) Notice: Subject to any disclaimer, the term of this patent is extended or adjusted under 35 U.S.C. 154(b) by 139 days.

(21) Appl. No.: 09/882,824

(22) Filed: Jun. 14, 2001

(65) Prior Publication Data

US 2002/0045721 A1 Apr. 18, 2002

(30) Foreign Application Priority Data

Aug. 28, 2000 (KR) ........................................ 2000-50030

(51) Int. Cl.$^7$ ................................ C08F 4/70; C08F 4/50
(52) U.S. Cl. .................... 526/117; 526/335; 526/340.4; 526/131; 502/170; 502/203; 502/207; 502/154
(58) Field of Search ................................ 526/117, 131, 526/335, 340.4

(56) References Cited

U.S. PATENT DOCUMENTS

| | | | |
|---|---|---|---|
| 3,483,177 A | * | 12/1969 | Throckmorton et al. |
| 4,533,711 A | | 8/1985 | Takeuchi et al. |
| 5,100,982 A | | 3/1992 | Castner |
| 5,451,646 A | | 9/1995 | Castner |

FOREIGN PATENT DOCUMENTS

JP        53051286        5/1978

* cited by examiner

*Primary Examiner*—Caixia Lu
(74) *Attorney, Agent, or Firm*—Davidson, Davidson & Kappel, LLC

(57) ABSTRACT

A method for preparing polybutadiene having controlled molecular weight and high 1,4-cis content over 95% in the presence of a diethylzinc compound as a cocatalyst (i.e., alkylating agent) and molecular-weight-controlling agent, in which the molecular weight of the polybutadiene is controlled by variating the added amount of the diethylzinc compound without deterioration of 1,4-cis content nor polymerization yield, thus guaranteeing the optimum processability and physical properties of polymer according to the use purpose.

8 Claims, No Drawings

METHOD FOR PREPARING POLYBUTADIENE HAVING CONTROLLED MOLECULAR WEIGHT AND HIGH 1,4-CIS CONTENT

TECHNICAL FIELD

The present invention generally relates to a method for preparing polybutadiene having controlled molecular weight and high 1,4-cis content over 95% and, more particularly, to a method for polymerizing 1,3-butadiene in the presence of an organonickel compound and borontrifluoride etherate using a diethylzinc compound as an alkylating and molecular-weight-controlling agent to control the molecular weight of the resulting polymer simply by varying the amount of the diethylzinc compound, thereby enhancing the properties of the polymer such as processability or strength without deteriorating 1,4-cis content nor polymerization yield.

BACKGROUND OF THE INVENTION

According to the conventional method of controlling the molecular weight of high 1,4-cis polybutadiene (hereinafter, referred to as "high-cis BR"), for example, U.S. Pat. No. 5,100,982 discloses a method of using organonickel compound, organoaluminum compound and borontrifluoride etherate as a main catalyst, together with halogen-substituted phenol derivative as an additive to control the molecular weight and the molecular weight distribution of the high-cis BR.

U.S. Pat. No. 5,451,646 also discloses a method of using organonickel compound, organoaluminum compound and fluorine containing compound as a main catalyst, together with p-styrenated diphenyl amine to control the molecular weight of the high-cis BR, thereby improving the processability.

Further, Japanese Patent Laid-open Sho 53-51286 describes a method of preparing high-cis BR with a narrow molecular weight distribution using nickel compound, boron compound, alkyllithium and alkylbenzene sulfonate.

In addition, U.S. Pat. No. 4,533,711 discloses a method of further extending the molecular weight distribution of high-cis BR, wherein rare earth metal compound belonging to the atomic number of 57 to 71, organoaluminum compound and halogenated aluminum compound are used as a main catalyst, while using organoaluminum hydrides or hydrocarbons containing an activated hydrogen compound as an additive.

However, the above-described conventional methods of controlling the molecular weight in preparing high-cis BR are problematic in that the yield and the 1,4-cis content are lowered with great complexity of the process for industrial production.

Typically, the molecular weight as well as the molecular weight distribution is directly concerned with the processability and physical properties of polymer. Considering the above-mentioned problem, there is a need for rubbers having a low molecular weight and a considerably high molecular weight distribution in the manufacture of tires with improved processability, and rubbers having a high molecular weight and a low molecular weight distribution in the manufacture of tires with excellent physical properties such as high shock resistance and high tensile strength.

SUMMARY OF THE INVENTION

Accordingly, the inventors of this invention have attempted to solve the above-mentioned problems concerning the control of molecular weight in preparation of high-cis BR and contrived a method for preparing high-cis BR using a diethylzinc compound instead of an organoaluminum compound as an alkylating agent and molecular weight controlling agent, thereby readily controlling the molecular weight of high-cis BR based on the added amount of the diethylzinc compound without deteriorating 1,4-cis content nor polymerization yield.

It is an object of the present invention to provide a method for preparing polybutadiene having controlled molecular weight and high 1,4-cis content, in which a diethylzinc compound is added as an alkylating agent and molecular weight controlling agent without another additive to reduce the complexity of the process and control the molecular weight of high-cis BR without deteriorating polymerization yield nor 1,4-cis content, thus optimizing the processability and physical properties of rubber.

To achieve the above object of the present invention, there is provided a method for preparing polybutadiene having controlled molecular weight and high 1,4-cis content from polymerization of 1,3-butadiene using a catalyst obtained by aging a mixture of an organonickel compound, borontrifluoride etherate, and additionally a diethylzinc compound used as an alkylating agent and molecular-weight-controlling agent.

DESCRIPTION OF THE PREFERRED EMBODIMENTS

Now, the present invention will be described in further detail as set forth hereunder.

The present invention is directed to a method for regulating the catalyst activity based on the added amount of a diethylzinc compound and thereby controlling the molecular weight of high-cis BR that affects the processability and physical properties of rubbers, without deteriorating polymerization yield nor 1,4-cis content.

The catalyst as used herein comprises an organonickel compound, boron trifluoride etherate, and a diethylzinc compound used as an alkylating agent and molecular-weight-controlling agent.

According to the present invention, the high-cis BR has a higher molecular weight with an increase in the added amount of the diethylzinc compound, which tendency similarly appears in the conventional polymerization of 1,3-butadiene using a triethylaluminum compound as an alkylating agent.

Preferably, the diethylzinc compound is added in a molar ratio of 2 to 15 per 1 mole of nickel catalyst. If the molar ratio of such amount is less than 2 per 1 mole of nickel catalyst, the catalyst activity is deteriorated with a rapid drop of polymerization yield. But, in case of exceeding the molar ratio of 15, a color of the catalyst is susceptible to be changed into dark black and caused a precipitation due to over-reduction reaction during the aging step, which makes it impossible to weight the catalyst accurately or results in discoloration of high-cis BR.

As for the organonickel compound of the catalyst, compounds having a ligand that has a good solubility in non-polar solvents are preferred. For example, such compounds include nickel hexanoate, nickel heptanoate, nickel octanoate, nickel 2-ethylhexanoate, nickel naphthenate, nickel versatate, nickel stearate, nickel bis (2,2,6,6-tetramethyl-3,5-heptanedionate), preferably those containing at least 6 carbon atoms.

The borontrifluoride etherate composing the catalyst is a complex of an ether compound, the examples of which may include dimethyl ether, diethyl ether, dibutyl ether, tetrahydrofuran, dihexyl ether, dioctyl ether, and methyl t-butyl ether.

In line with the process of aging the Ziegler-Natta catalyst, it is prerequisite that the solvent used for aging the catalyst should not be reactive to the catalyst. Preferably, the catalyst-aging solvent is selected from the group consisting of cyclohexane, hexane, heptane and toluene.

It is preferable that the mixing ratio of organonickel compound, borontrifluoride etherate and diethylzinc compound in the catalyst is determined as follows: the molar ratio of diethylzinc compound to nickel compound is 2:1 to 15:1; the molar ratio of boron trifluoride etherate to organozinc compound is 0.7:1 to 5:1; the molar ratio of boron trifluoride etherate to nickel compound is 1:1 to 30:1.

The sequential order of adding the individual catalysts in preparation of the aged catalyst is as follows: a light-green colored nickel catalyst solution (in cyclohexane) containing 1,3-butadiene is added to a catalyst reactor under the nitrogen atmosphere, and then borontrifluoride etherate and the diethylzinc compound functioned as an alkylating agent and molecular weight controlling agent according to the present invention are introduced.

Since the sequential order of adding each catalyst significantly affects the properties of the final product, high-cis BR, extreme caution should be exercised in observing such sequential adding order.

Meanwhile, the temperature and time related to aging of the catalyst also affect the properties of high-cis BR; the appropriate aging time ranges from 5 minutes to 2 hours, while the aging temperature is preferably in the range of −20 to 60° C.

Then, 1,3-butadiene and the aged Ziegler-Natta catalyst are admixed with a polymerization solvent to initiate polymerization. Since the polymerization solvent used for this invention may significantly affect the polymerization, it should be added to the reactor after oxygen and water are entirely removed.

Preferably, the polymerization solvent as used herein is a non-polar solvent, such as a cyclohexane, heptane, hexane, benzene, and toluene.

The polymerization is preferably initiated under the high-purity nitrogen atmosphere in the reaction temperature range from the room temperature to 100° C. for 2 hours in the presence of an appropriate catalyst to attain the desired product with a yield of at least 90%.

After the reaction is completed, reaction terminator, for example, polyoxyethyleneglycolether organophosphate and 2,6-di-t-butyl-p-cresol are added to the reaction mixture, followed by precipitation in methyl alcohol or ethyl alcohol to obtain the final product.

The present invention will be explained based on the following examples in more detail as set forth hereunder but is not limited by these examples.

EXAMPLE 1

A Ziegler-Natta catalyst was prepared by mixing nickel naphthenate (0.05% solution in cyclohexane), borontrifluoride butylether (1.5% solution in cyclohexane), and diethylzinc (3.0% solution in cyclohexane) with or without a small amount of 1,3-butadiene, followed by aging.

The catalyst was aged in such a manner that (a) an 100 ml round-bottomed flask was sufficiently purged with nitrogen and was sealed tightly with rubber stopper, and (b) nickel naphthenate, borontrifluoride butylether and diethylzinc were sequentially charged to the flask in a molar ratio of 1:14:10, followed by aging at 20° C. for 1 hour prior to use.

The polymerization reaction was performed in such a manner that (a) a 360 ml pressure reactor was sufficiently filled with nitrogen, and (b) a polymerization solvent, as prepared by mixing cyclohexane and heptane in a ratio of 9:1 by weight, the above-aged Ziegler-Natta catalyst, and 1,3-butadiene monomer were added to the reactor and reacted at 40° C. for 2 hours.

The ratio of polymerization solvent to monomer was 4.5:1, and 2,6-di-t-butyl-p-ceresol, polyoxyethyleneglycolether organophosphate and ethanol were added to the reaction mixture to complete the reaction.

EXAMPLES 2 TO 5

The same procedures were performed as described in Example 1 to produce polybutadiene having controlled molecular weight and high 1,4-cis content, excepting that the composition of the diethylzinc compound was selected as shown in Table 1.

TABLE 1

| Example | Catalyst Composition[1] | Catalyst Mole Ratio | Weight Average Molecular Weight ($M_w$) | Number of Moles of Ni Catalyst[2] | 1,4-cis Content (%) | Yield (%, 2 h) |
| --- | --- | --- | --- | --- | --- | --- |
| 1 | Ni(naph)$_2$/ | 1:14:10 | 423,000 | $1.5 \times 10^{-4}$ | 96.5 | 100 |
| 2 | BF$_3$OBu$_2$/ | 1:14:8 | 350,000 | $2.0 \times 10^{-4}$ | 97.0 | 100 |
| 3 | Et$_2$Zn | 1:14:6 | 302,000 | $2.0 \times 10^{-4}$ | 97.2 | 100 |

TABLE 1-continued

| Example | Catalyst Composition[1] | Catalyst Mole Ratio | Weight Average Molecular Weight ($M_w$) | Number of Moles of Ni Catalyst[2] | 1,4-cis Content (%) | Yield (%, 2 h) |
|---|---|---|---|---|---|---|
| 4 | | 1:14:5 | 270,000 | $2.0 \times 10^{-4}$ | 97.1 | 100 |
| 5 | | 1:14:5 | 295,000 | $1.5 \times 10^{-4}$ | 97.0 | 100 |

Note:
Ni(naph)$_2$ = Ni(naphthenate)$_2$
The number of moles used per 100 g of 1,3-butadiene

EXAMPLES 6 TO 9

The same procedures were performed as described in Example 1 to produce polybutadiene having controlled molecular weight and high 1,4-cis content, excepting that the types of nickel catalyst and borontrifluoride etherate were varied as well as the concentration of borontrifluoride etherate. The results are presented in Table 2.

TABLE 2

| Examples | Catalyst Composition[1] | Catalyst Mole Ratio | Weight Average Molecular Weight ($M_w$) | Number of Moles of Ni Catalyst[2] | 1,4-cis Content (%) | Yield (%, 2 h) |
|---|---|---|---|---|---|---|
| 6 | Ni(2-eth)$_2$/ BF$_3$OEt$_2$/ Et$_2$Zn | 1:16:5 | 255,000 | $1.5 \times 10^{-4}$ | 97.5 | 100 |
| 7 | Ni(str)$_2$/ BF$_3$OEt$_2$/ Et$_2$Zn | 1:12:5 | 304,000 | $1.5 \times 10^{-4}$ | 97.1 | 100 |
| 8 | Ni(vers)$_2$/ BF$_3$OEt$_2$/ Et$_2$Zn | 1:9:5 | 320,000 | $1.5 \times 10^{-4}$ | 97.0 | 100 |
| 9 | Ni(bth)/ BF$_3$OBu$_2$/ Et$_2$Zn | 1:14:10 | 403,000 | $2.0 \times 10^{-4}$ | 97.0 | 100 |

Note:
Ni(2-eth)$_2$ = Ni(2-ethylhexanoate)$_2$
Ni(str)$_2$ = Ni(stearate)$_2$
Ni(vers)$_2$ = Ni(versatate)$_2$
Ni(bth) = Ni bis(2,2,6,6-tetramethyl-3,5-heptanedionate)
[2]The number of moles used per 100 g of 1,3-butadiene

COMPARATIVE EXAMPLES 1 TO 4

The same procedures were performed as described in Example 1 to produce polybutadiene having a high 1,4-cis content, excepting that triethylaluminum or dimethylzinc was used instead of diethylzinc as an alkylating and molecular-weight-controlling agent of the present invention. The results are presented in Table 3.

TABLE 3

| Comparative Examples | Catalyst Composition[1] | Catalyst Mole Ratio | Weight Average Molecular Weight ($M_w$) | Number of Moles of Ni Catalyst[2] | 1,4-cis Content (%) | Yield (%, 2 h) |
|---|---|---|---|---|---|---|
| 1 | Ni(naph)$_2$/ BF$_3$OBu$_2$/ AlEt$_3$ | 1:14:3 | 426,000 | $1.5 \times 10^{-4}$ | 97.0 | 58 |
| 2 | | 1:14:2 | 450,000 | $1.0 \times 10^{-4}$ | 97.4 | 76 |
| 3 | Ni(nath)$_2$/ BF$_3$OBu$_2$/ ZnMe$_2$ | 1:14:5 | 350,000 | $1.5 \times 10^{-4}$ | 97.5 | 22[3] |
| 4 | | 1:14:10 | 451,000 | $2.0 \times 10^{-4}$ | 96.5 | 79[4] |

Note:
[1]Ni(nath)$_2$ = Ni(naphthenate)$_2$
[2]The number of moles used per 100 g of 1,3-butadiene
[3]Comparative Example 3: Yield after 28 hours of polymerization
[4]Comparative Example 4: Yield after 13 hours of polymerization From the results of Tables 1 and 3, it is revealed that if the molecular weight of polybutadiene was controlled based on the varied composition of the catalyst using triethylaluminum instead of diethylzinc, there was a limitation in lowering the molecular weight below a predetermined value and that the use of dimetylzinc as an alkylating agent results in deterioration of the polymerization yield. By contrast, the present invention readily prepares polybutadiene having controlled molecular weight and high 1,4-cis content over 95% without deterioration of the polymerization yield by controlling the added amount of the diethylzinc compound as an alkylating and molecular-weight-controlling agent.

As described above in detail, in preparation of polybutadiene having a high 1,4-cis content using an aged catalyst obtained from a mixture of organonickel compound, borontrifluoride etherate and diethylzinc compound, the present invention easily controls the molecular weight of the polybutadiene by varying the added amount of the diethylzinc compound without deteriorating polymerization yield nor 1,4-cis content, thereby optimizing the processability and physical properties of rubbers.

What is claimed is:

1. A method for preparing polybutadiene having controlled molecular weight and high 1,4-cis content over 95%, in which 1,3-butadiene is polymerized in a non-polar solvent using a Ziegler-Natta catalyst, the method comprising preparing the Ziegler-Natta catalyst by adding a diethylzinc compound as an alkylating and molecular-weight-controlling agent to a mixture of an organonickel compound and borontrifluoride etherate with or without a conjugated diene compound, followed by aging.

2. The method as claimed in claim 1, wherein the diethylzinc compound and the organonickel compound are mixed in a molar ratio of 2:1 to 15:1.

3. The method as claimed in claim 2, wherein the organonickel compound is selected from the group consisting of nickel hexanoate, nickel heptanoate, nickel octanoate, nickel 2-ethylhexanoate, nickel naphthenate, nickel versatate, nickel stearate, nickel bis(2,2,6,6-tetramethyl-3,5-heptanedionate), or mixtures of at least two of these compounds.

4. The method as claimed in claim 1, wherein the borontrifluoride etherate and the diethylzinc compound are mixed in a molar ratio of 0.7:1 to 5:1.

5. The method as claimed in claim 1, wherein the organonickel compound is selected from the group consisting of nickel hexanoate, nickel heptanoate, nickel octanoate, nickel 2-ethylhexanoate, nickel naphthenate, nickel versatate, nickel stearate, nickel bis(2,2,6,6-tetramethyl-3,5-heptanedionate), or mixtures of at least two of these compounds.

6. The method as claimed in claim 1, wherein the borontrifluoride etherate is one selected from the group consisting of borontrifluoride dimethylether, borontrifluoride diethylether, borontrifluoride dibutylether, borontrifluoride tetrahydrofuran, or mixtures of at least two of these compounds.

7. The method as claimed in claim 1, wherein aging of the catalyst is performed in the temperature range from $-20°$ C. to $60°$ C. for 5 minutes to 10 hours.

8. The method as claimed in claim 1, wherein the molecular weight is controlled by variation of the added amount of the diethylzinc compound.

* * * * *